(12) United States Patent
Weston et al.

(10) Patent No.: US 11,407,260 B2
(45) Date of Patent: Aug. 9, 2022

(54) BALL AND SOCKET ARTICULATING TPM SENSOR

(71) Applicant: SENSATA TECHNOLOGIES, INC., Attleboro, MA (US)

(72) Inventors: Michael D. Weston, Newtownabbey (GB); Thomas J. O'Brien, Randalstown (GB)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 17/355,487

(22) Filed: Jun. 23, 2021

(65) Prior Publication Data

US 2022/0016945 A1 Jan. 20, 2022

Related U.S. Application Data

(60) Provisional application No. 63/051,968, filed on Jul. 15, 2020.

(51) Int. Cl.
*B60C 23/04* (2006.01)
*B60C 29/02* (2006.01)

(52) U.S. Cl.
CPC .......... *B60C 23/0494* (2013.01); *B60C 29/02* (2013.01)

(58) Field of Classification Search
CPC ............ B60C 23/0408; B60C 23/0496; B60C 23/0494; B60C 23/061; B60C 23/0416; B60C 23/0433; B60C 23/0493; B60C 19/00; B60C 23/04; B60C 23/0479; B60C 23/0462; B60C 23/0411; B60C 23/041; B60C 11/24; B60C 23/0444; B60C 23/20; B60C 23/064; B60C 23/0401; B60C 23/0488; B60C 23/062; B60C 23/0413; B60C 23/007; B60C 23/0452;
(Continued)

(56) References Cited

U.S. PATENT DOCUMENTS 6,952,955 B1 10/2005 Uleski
7,021,133 B1 * 4/2006 Hsu .................... B60C 23/0408
73/146.8
(Continued)

FOREIGN PATENT DOCUMENTS

CN 112537176 A * 3/2021 ............. B60C 29/02
GB 2580387 A * 7/2020 ......... B60C 23/0494
(Continued)

OTHER PUBLICATIONS

International Search Report and Written Opinion, PCT/US2021/038570, dated Oct. 1, 2021, 12 pages.

*Primary Examiner* — Andre J Allen
(74) *Attorney, Agent, or Firm* — Mark H. Williams (57) ABSTRACT

A tire monitoring apparatus comprises a sensor housing having a connection part integrated with the sensor housing, the connection part having an elongated opening and a corresponding mounting feature in a wheel rim, wherein a screw extends through the elongated opening and connects with the corresponding mounting feature in the wheel rim, thereby when the screw is not tightened fully, the sensor housing can be rotated with respect to the corresponding mounting feature in the wheel rim, and when the screw is tightened fully, the sensor housing is secured in place and does not rotate with respect to the corresponding mounting feature in the wheel rim.

6 Claims, 13 Drawing Sheets

(58) Field of Classification Search
CPC ... B60C 11/246; B60C 23/06; B60C 23/0442; B60C 23/043; B60C 99/006; B60C 23/0498; B60C 23/00354; B60C 23/02; B60C 23/0467; B60C 2019/004; B60C 23/0428; B60C 23/04985; B60C 23/00372; B60C 23/009; B60C 23/0425; B60C 23/00318; B60C 11/243; B60C 23/004; B60C 23/045; B60C 23/0464; B60C 23/00363; B60C 23/0472; B60C 23/066; B60C 29/02; B60C 11/00; B60C 23/0403; B60C 23/006; B60C 23/0406; B60C 23/044; B60C 23/0454; B60C 23/00; B60C 23/008; B60C 23/0455; B60C 23/0461; B60C 23/0483; B60C 25/002; B60C 23/0415; B60C 23/0474; B60C 23/0489; B60C 29/064; B60C 2200/02; B60C 23/0481; B60C 23/0491; B60C 23/0459; B60C 23/0471; B60C 23/0477; B60C 11/0318; B60C 2019/005; B60C 23/0405; B60C 23/042; B60C 23/002; B60C 23/00336; B60C 23/0422; B60C 25/132; B60C 13/001; B60C 23/0437; B60C 23/0466; B60C 23/0476; B60C 29/06; B60C 9/18; B60C 23/00345; B60C 23/0423; B60C 23/0449; B60C 23/0447; B60C 25/00; B60C 13/00; B60C 17/00; B60C 19/003; B60C 2019/006; B60C 23/0427; B60C 23/0486; B60C 23/065; B60C 17/02; B60C 23/001; B60C 23/0445; B60C 23/0484; B60C 23/08; B60C 5/004; B60C 9/02; B60C 23/0457; B60C 25/142; B60C 25/145; B60C 11/0083; B60C 11/13; B60C 23/0418; B60C 23/0469; B60C 23/127; B60C 25/18; B60C 11/0332; B60C 23/0432; B60C 23/068; B60C 23/126; B60C 25/005; B60C 25/138; B60C 29/00; B60C 5/14; B60C 99/003; B60C 11/03; B60C 11/12; B60C 17/04; B60C 17/06; B60C 23/005; B60C 23/063; B60C 23/135; B60C 23/137; B60C 25/007; B60C 25/0554; B60C 25/14; B60C 29/062; B60C 29/066; B60C 3/00; B60C 11/0302; B60C 11/032; B60C 11/11; B60C 13/003; B60C 13/02; B60C 19/001; B60C 2011/1213; B60C 2011/1231; B60C 2011/1245; B60C 23/10; B60C 23/131; B60C 23/16; B60C 25/056; B60C 29/005; B60C 29/04; B60C 29/068; B60C 3/04; B60C 5/142; B60C 9/20; B60C 99/00; B60C 11/01; B60C 11/02; B60C 11/0304; B60C 11/0306; B60C 15/06; B60C 17/0009; B60C 19/002; B60C 19/08; B60C 19/12; B60C 2009/2038; B60C 2011/0374; B60C 2011/0388; B60C 2200/065; B60C 23/0305; B60C 23/00347; B60C 23/0435; B60C 23/067; B60C 23/121; B60C 23/123; B60C 23/133; B60C 23/18; B60C 25/02; B60C 25/05; B60C 5/22; B60C 7/12; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0033; B60C 2011/0358; B60C 2011/1254; B60C 2017/068; B60C 2019/007; B60C 2200/06; B60C 2200/12; B60C 2200/14; B60C 25/0503; B60C 25/0515; B60C 25/0521; B60C 25/0548; B60C 25/0551; B60C 25/15; B60C 25/16; B60C 29/007; B60C 3/06; B60C 5/001; B60C 5/002; B60C 5/02; B60C 5/20; B60C 7/00; B60C 7/105; B60C 7/107; B60C 9/005; B60C 9/1807; B60C 9/28; G01M 17/02; G01M 17/022; G01M 17/027; G01M 17/021; G01M 17/024; G01M 17/025; G01M 17/013; G01M 17/007; G01M 1/045; G01M 1/02; G01M 1/326; G01M 17/06; G01M 1/30; G01M 1/225; G01M 17/0074; G01M 5/0058; G01M 1/26; G01M 17/04; G01M 17/0072; G01M 17/065; G01M 17/10; G01M 1/16; G01M 7/00; G01M 99/00; G01M 3/40; G01M 7/08; G01M 1/34; G01M 1/04; G01M 17/028; G01M 17/045; G01M 17/08; G01M 3/3218; G01M 1/365; G01M 13/04; G01M 17/03; G01M 5/0066; G01M 5/0091; G01M 1/00; G01M 1/08; G01M 1/22; G01M 13/027; G01M 15/044; G01M 5/0033; G01M 5/0075; G01M 1/06; G01M 1/12; G01M 1/122; G01M 1/24; G01M 1/32; G01M 1/36; G01M 11/081; G01M 13/023; G01M 13/025; G01M 17/00; G01M 17/0076; G01M 3/022; G01M 3/04; G01M 3/042; G01M 3/045; G01M 3/147; G01M 3/227; G01M 3/24; G01M 3/2876; G01M 3/3236; G01M 5/0016; G01M 5/0025; G01M 5/0083; G01M 7/02; G01M 7/022; G01M 7/025; G01M 7/04; G01M 7/06; G01M 9/02; G01M 9/04; G01M 99/002; G01M 99/004

See application file for complete search history.

(56) References Cited

U.S. PATENT DOCUMENTS

| | | | |
|---|---|---|---|
| 7,134,345 B2 | 11/2006 | Kaiser et al. | |
| 2008/0121032 A1* | 5/2008 | Qiu | B60C 23/0494 73/146.8 |
| 2012/0111102 A1 | 5/2012 | Tadele et al. | |
| 2012/0204634 A1 | 8/2012 | Yu et al. | |
| 2015/0068297 A1* | 3/2015 | Duffy | B60C 23/0494 73/146.8 |
| 2020/0039301 A1 | 2/2020 | McClurg et al. | |
| 2020/0114792 A1 | 4/2020 | Okuma et al. | |

FOREIGN PATENT DOCUMENTS

| | | | | |
|---|---|---|---|---|
| GB | 2589141 A | * | 5/2021 | ......... B60C 23/0494 |
| GB | 2589142 A | * | 5/2021 | ......... B60C 23/0494 |

* cited by examiner

BALL AND SOCKET ARTICULATING TPM SENSOR

RELATED APPLICATIONS

This application claims priority to, and incorporates by reference fully, U.S. Provisional Patent Application 63/051,968 filed on Jul. 15, 2020.

TECHNICAL FIELD

The disclosure relates to tire pressure monitoring device(s), and/or systems, and more specifically to a Tire Pressure Monitoring System (TPMS) module having adjustable angular positioning.

BACKGROUND

Various tire pressure monitoring systems (TPMS) include an electronics module for housing a pressure measuring/sensing device and a transmission device, e.g., a signal transmitter. The housing is attached to a tire valve and installed inside a tire to monitor the air (gas) pressure inside the tire. The housing is shaped to be adjacent to, i.e., rest on, an interior rim well.

It is important that the angle between the housing and the interior wheel rim well is correct for reliability purposes, and so that the pressure measuring housing rests firmly on and conforms properly to the interior rim well. It is also important that the housing be shaped so as to advantageously contact with and fit with the rim well. An issue arises, however, with respect to the differences in the cross-sectional shapes of wheel rims. The cross-sectional shape of the wheel rim defines the angle required between the valve stem and the sensor housing. Accordingly, the valve and wheel geometries may combine to prevent the sensor housing from being properly seated on the interior rim well, unless the TPMS can adjust its angular configuration and have a proper corresponding shape. If not properly seated, the pressure measuring housing will not rest firmly enough or conform well enough to the interior rim well shape, and loads applied to the sensor during use and service can lead to less accurate sensor measurements.

Various embodiments disclosed herein address a number of the issues noted herein.

SUMMARY

The following summary is meant to help one skilled in the art understand the various presently disclosed combinations of features. It is not meant to unduly limit the scope of any pending or future claims relating to the disclosure.

Various embodiments provide a wide angular range, and secure fit, between the valve stem and the sensor body, and are suitable for use on multiple wheel rim geometries.

According to an embodiment, a tire pressure monitoring device comprises a sensor housing comprising an outer casing that defines an internal space, wherein the sensor housing includes a top surface and a bottom surface, extending from and beyond the bottom surface are at least two foot portions, the foot portions being proximate to a first edge of the sensor housing; a pressure sensor device located at least partially inside the internal space and communicatively connected to an area outside the sensor housing, to measure pressure in an area outside the housing; a signal transmitter that interfaces with the pressure sensor and relays an electromagnetic signal that is detectable by a receiver that is remote from the sensor housing and that wirelessly represents detected pressure outside of the sensor housing; a connection part integrated with the sensor housing and located proximate to a second edge of the housing that is opposite to the first edge that is proximate to the at least two foot portions; the connection part comprising a concave portion facing internally toward a recessed portion of the sensor housing, the concave portion having an elongated opening defined therein that extends at least partially in a direction perpendicular to the second edge; the connection part has a convex valve mating surface that is external and faces outward away from the sensor housing, and forms a convex shape; a valve base is formed of a tubular body extending in a direction, has an internal annulus that extends therethrough defining an inner passageway that is at least partially threaded, a top surface, a head portion is located at an end of the valve base and forms a flat circular shaped surface with the annulus extending therethrough; a ball head screw comprises an elongated tubular body having an annulus defined therethrough, and a threaded portion on the outer surface, the threaded portion extending from a location proximate one end of the elongated tubular body to a head portion of the ball head screw, the head portion comprising a curved convex face that faces the threaded portion, wherein the threaded portion is adapted to mate with the internal threaded portion inside the valve base, and the curved convex face of the ball head screw is adapted to mate with the concave surface of the connection part, wherein when the ball head screw is mated with the threaded portion of the valve base, and the convex valve mating surface is held against the flat circular shaped surface of the valve base, rotation of the sensor housing with respect to the valve base is deterred.

According to another embodiment, a tire monitoring apparatus comprises a sensor housing having a pressure sensor and a connection part integrated with the sensor housing. The connection part comprises an external mating surface that is convex in shape, an internal concave surface facing toward a recessed portion of the sensor housing surface, the connection part defining therein a slot that extends through the connection part from the concave surface through to the convex surface and is elongated so that a screw with a head portion and a threaded body portion can extend through the slot so that the head of the screw is larger than the narrowest width of the slot and is held on the concave side of the connection part while the threaded body portion extends through the slot and protrudes beyond the convex surface of the connection part. The slot is adapted to allow for travel of the screw along a lengthwise direction of the slot while the screw remains substantially perpendicular to the concave surface and the head of the screw remains in contact with the concave surface, thereby allowing for rotation of the sensor housing with respect to the screw while maintaining contact between the screw head and the concave surface. The screw is configured to couple to a tire valve to maintain the sensor housing at an angle with respect to a tire valve, by way of tightening the screw into a threaded connection with the tire valve.

According to an embodiment, a tire monitoring apparatus comprises a sensor housing having a connection part integrated with the sensor housing, the connection part having an elongated opening and a corresponding mounting feature in a wheel rim, wherein a screw extends through the elongated opening and connects with the corresponding mounting feature in the wheel rim, thereby when the screw is not tightened fully, the sensor housing can be rotated with respect to the corresponding mounting feature in the wheel rim, and when the screw is tightened fully, the sensor housing is secured in place and does not rotate with respect to the corresponding mounting feature in the wheel rim.

Other aspects and advantages of the embodiments described herein will become apparent from the following description, taken in conjunction with the accompanying drawings.

BRIEF DESCRIPTION OF THE DRAWINGS

One or more aspects of the present disclosure are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended to be limiting. In the Figures.

DETAILED DESCRIPTION

In the following detailed description, various combinations of embodied features are disclosed in order to provide one skilled in the art an understanding of the aspects and implementations of the present disclosure. It will be understood by those of ordinary skill in the art that those may be practiced without some of the specific details that are set forth. In some instances, well-known methods, procedures, components and structures may not be described in detail so as not to obscure the details of the implementations of the present disclosure. The following detailed description is not meant to unduly limit any present or future claim scope in this or subsequent related applications. This disclosure may use different names, or different numerical identifiers, to describe the same feature or part, or partially the same part. Further, where considered appropriate, reference numerals may be repeated among the drawings to indicate corresponding or analogous elements. For purposes of clarity, however, not every component may be labeled in every drawing.

Various embodiments include, a TPMS with mounting features that are adjustable through a wide range of angles. The housing can be positioned so as to fit against, and securely contact with, an extensive range of wheel rim/valve combinations because of the adjustability of the design, as will be described below in more detail.

Figure 1A:
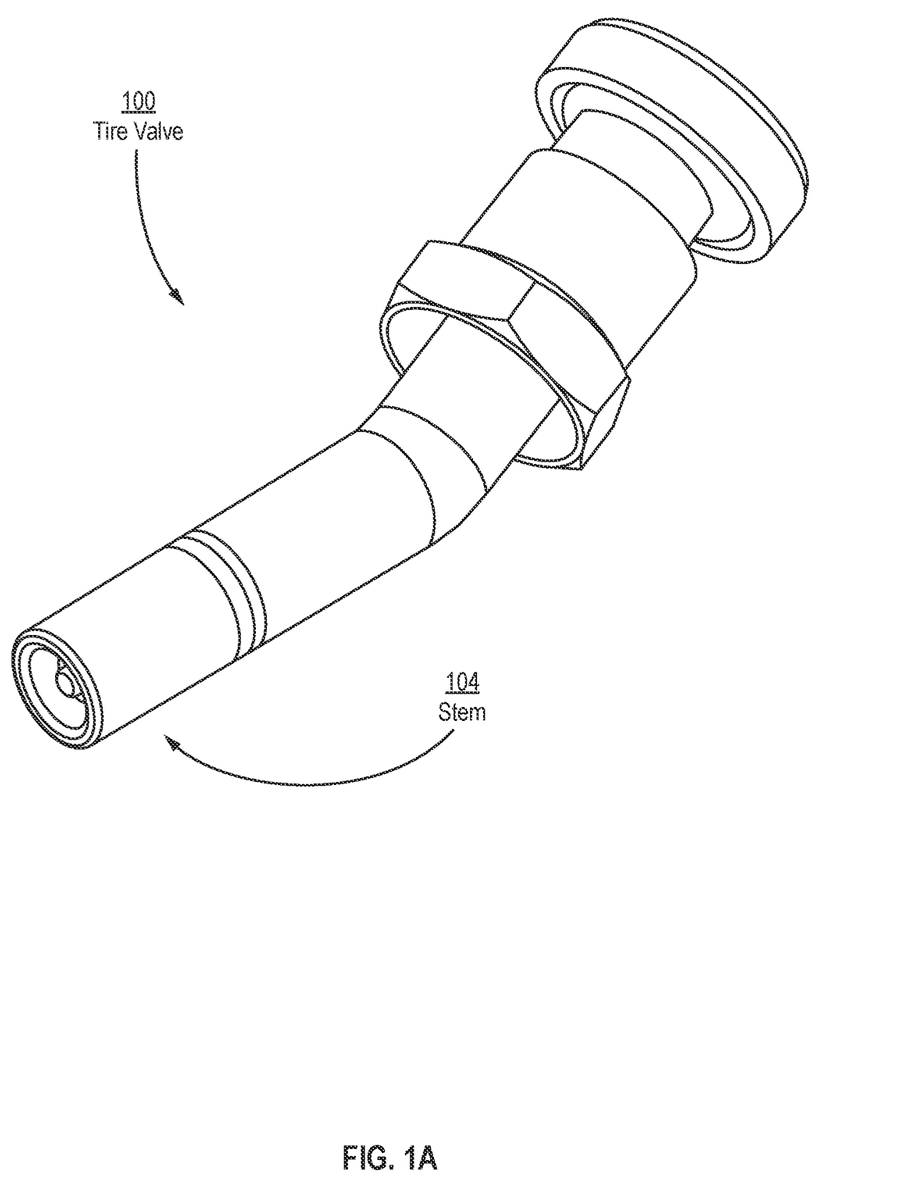
FIGS. 1A-1C are representative of a tire valve.
Figure 1B:
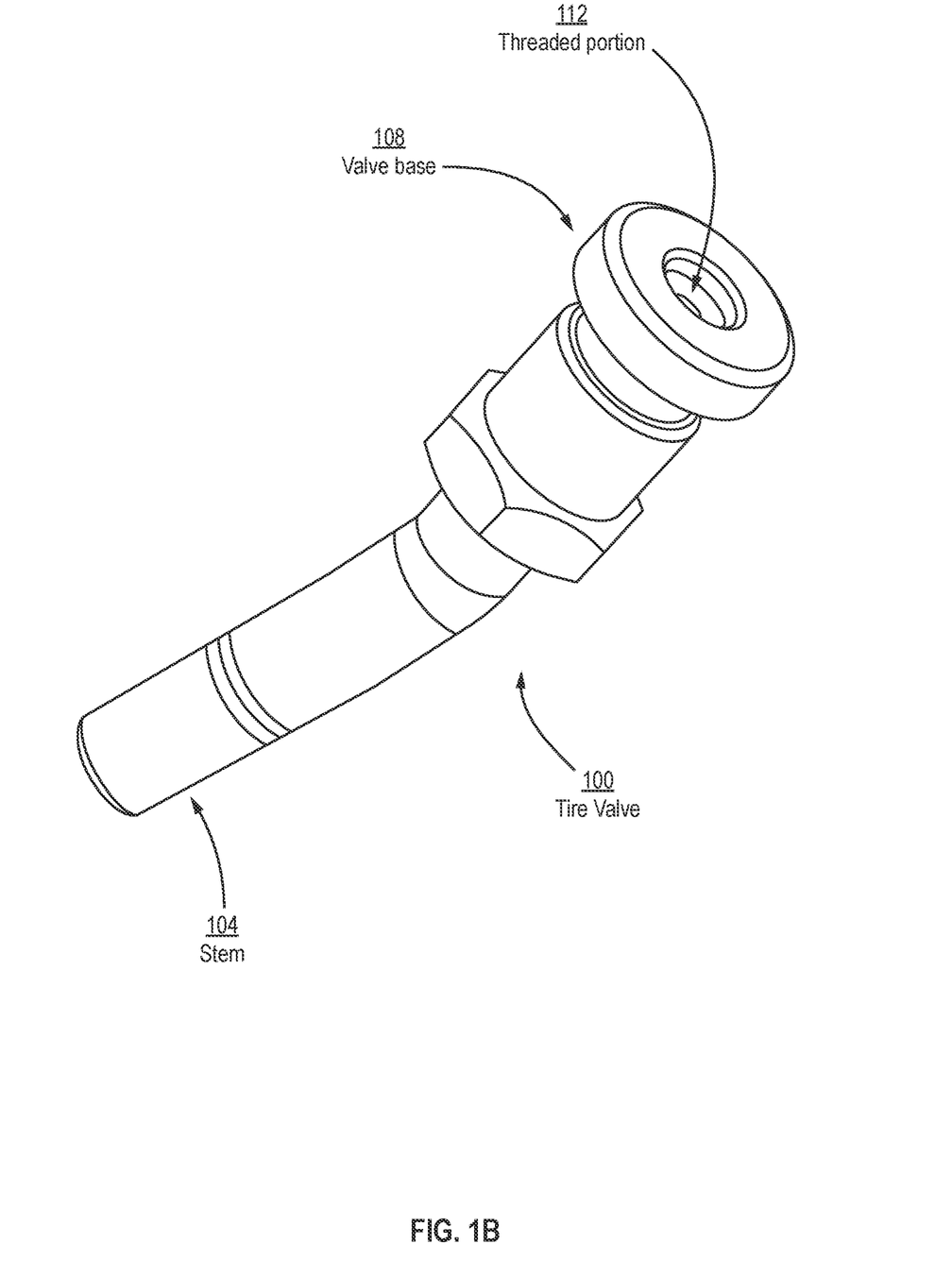
Figure 1C:
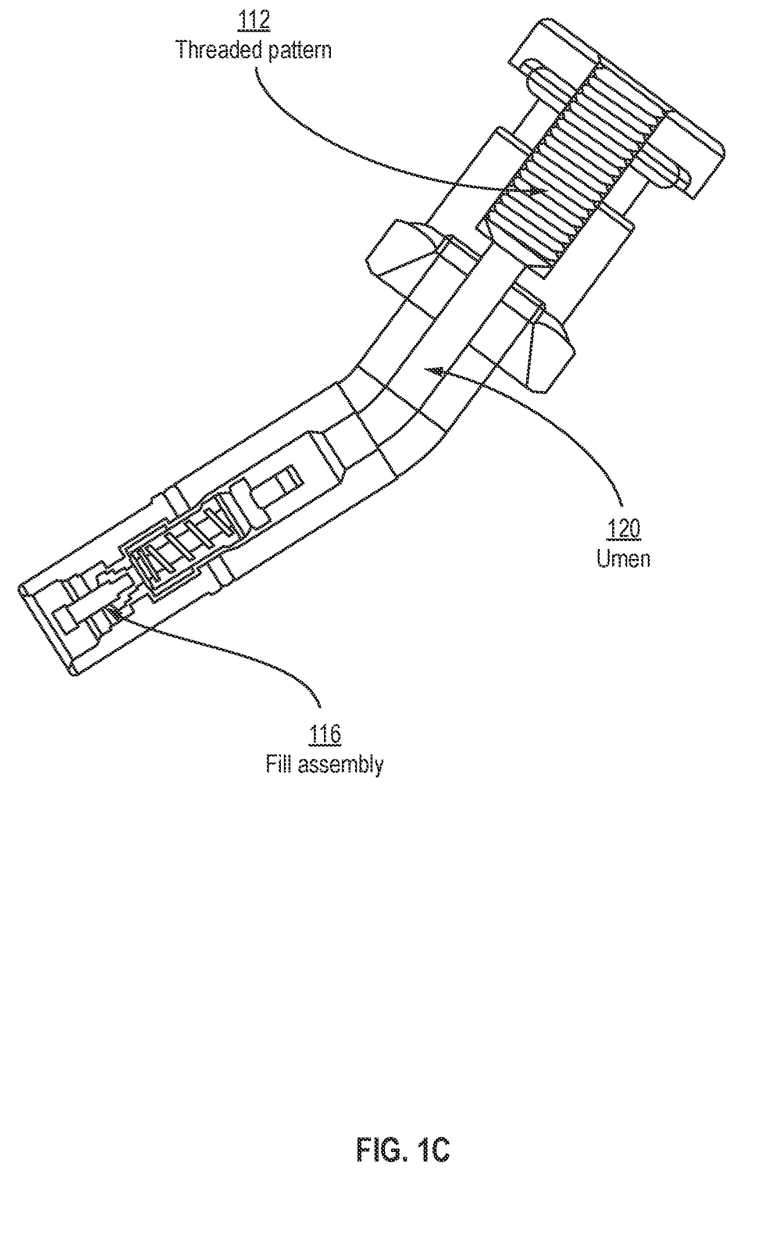

Referring now to FIGS. 1A-1C, a tire valve 100 includes a stem 104 and a valve base 108. The valve base 108 can include a disk-shaped portion that can have a flat edge that is perpendicular to a top surface of the disk shaped portion. When in use with a wheel rim and tire, the stem 104 is visible outside a tire (not shown) and forms a conduit through which air (gas) is provided to fill the tire. The valve stem 104 can be cylindrical in shape. The rim has a varying circular cross section and connects and rotates with respect to an axle, and the tire connects to and around the wheel rim, to form the rim and tire combination that is commonly used in connection with automobiles and trucks. The wheel rim and the tire together define an interior volume, which herein is referred to as the interior (inside) of the tire. When in use, the valve base 108 is in the interior of the tire and includes an internal threaded portion 112. In some embodiments, the internal threaded portion 112 of the valve base 108 is tapped with a M6 threaded hole to allow for a broader fitment range in truck wheel units. A fill assembly 116 is adapted to be connected to a pump (not shown) and provides for fluidic connection from the pump through a lumen 120 and the threaded portion 112, to the interior of the tire. A one-way valve (not shown in detail) is located in the fill assembly 116.

Figure 2A:
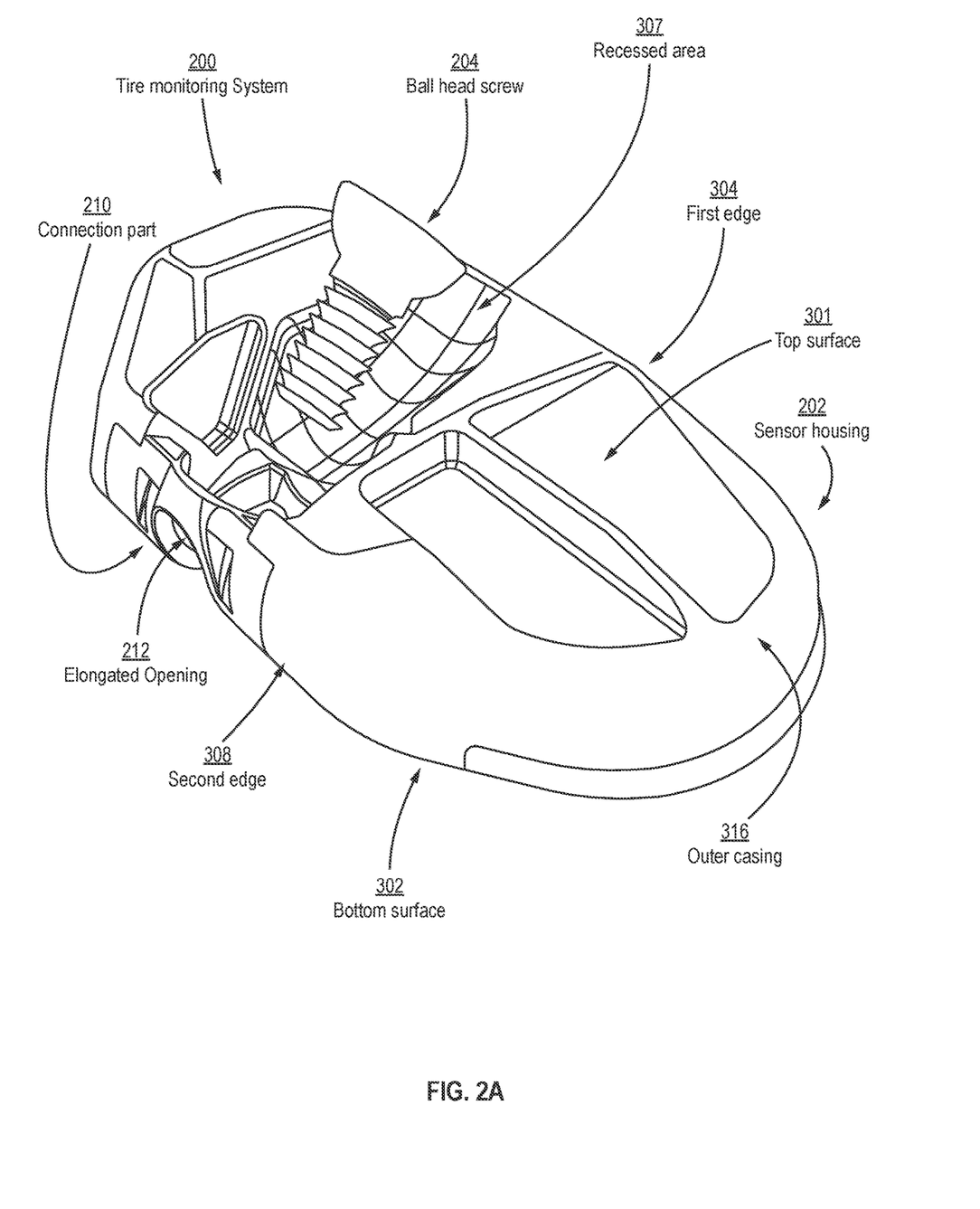
FIGS. 2A and 2B are representative of an embodiment of the disclosed tire monitoring system.
Figure 2B:
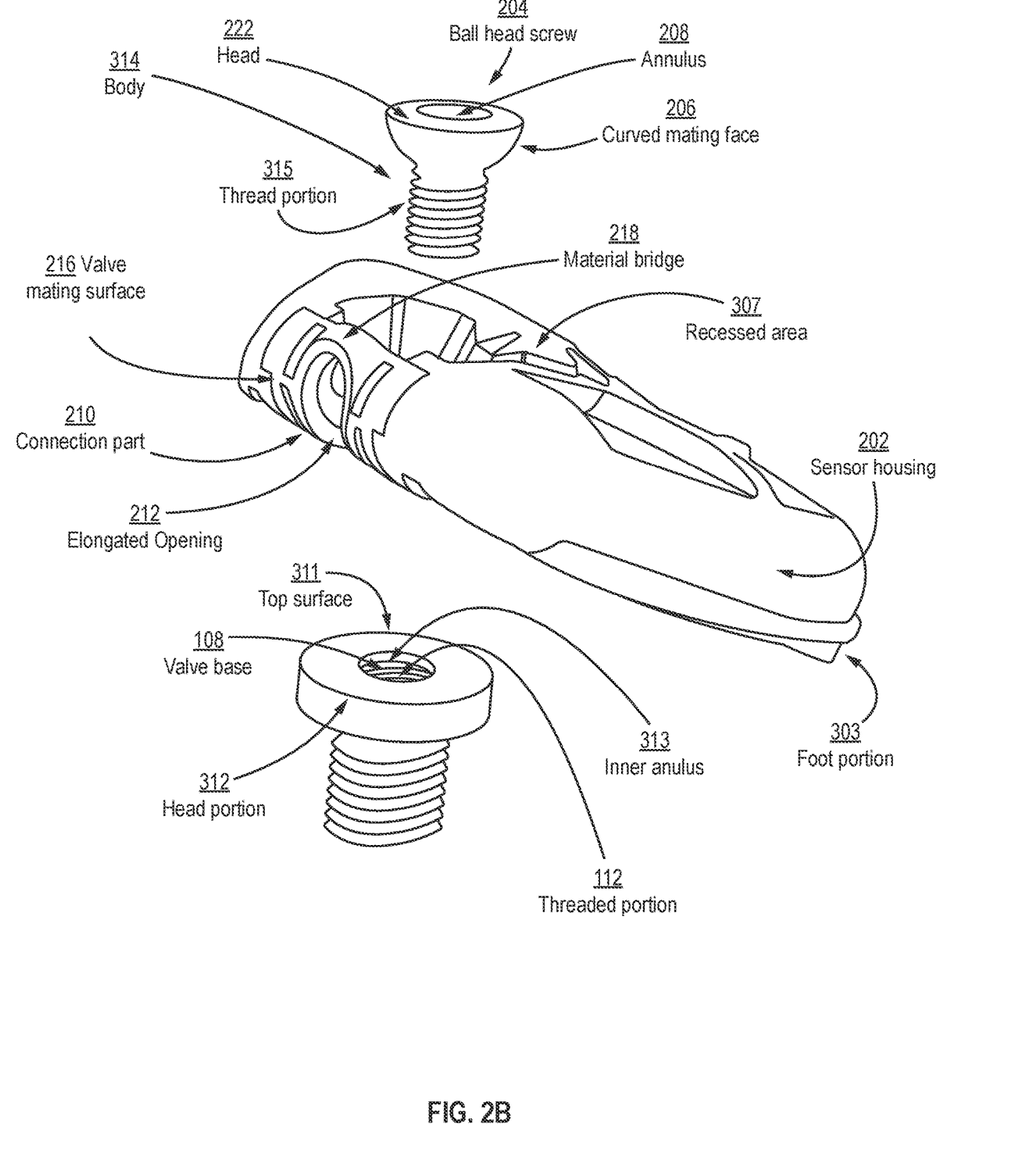

In accordance with various combinations of embodied features, as shown in FIGS. 2A and 2B, a tire monitoring system 200 includes a sensor housing 202. The sensor housing 202 comprises an outer casing 316 that has a top surface 301 and a bottom surface 302 that are connected by edge walls and defines an internal space (volume) 310. Two foot portions 303 extend from and beyond the bottom surface 302 and are proximate to a first edge 304 of the sensor housing 202. The two foot portions 303 are physical protrusions that are laterally spaced apart from one another in a direction extending along the first edge 304, so as to be adapted to form a first and second point of contact with a wheel rim, when in use, so that together with the connection to the tire valve 100 via a connection part 210, the sensor housing 202 has three points of support. The two foot portions 303 can conform with and make proper contact with wheel rims having a range of radiuses and profiles, while other portions of the bottom surface 302 do not contact the wheel rim, so that there are no more than three points of support. According to various embodiments, there are not more than two foot portions 303, since three or more foot portions would potentially produce a non-stable contact connection with wheel rims of different sizes. With only two foot portions 303, it is possible to have a secure connection, via the two foot portions 303 and the tire valve 100, for many different wheel rim radiuses.

Another embodiment has a malleable material connected with the bottom surface 302 that when pressed against the wheel rim conforms to the wheel rim, thus establishing a secure connection. The malleable material can be rubber, or other elastic materials. The malleable material can be foam, such as memory foam. The malleable material can be used in conjunction with, or instead of, the two foot portions 303.

Figure 6:
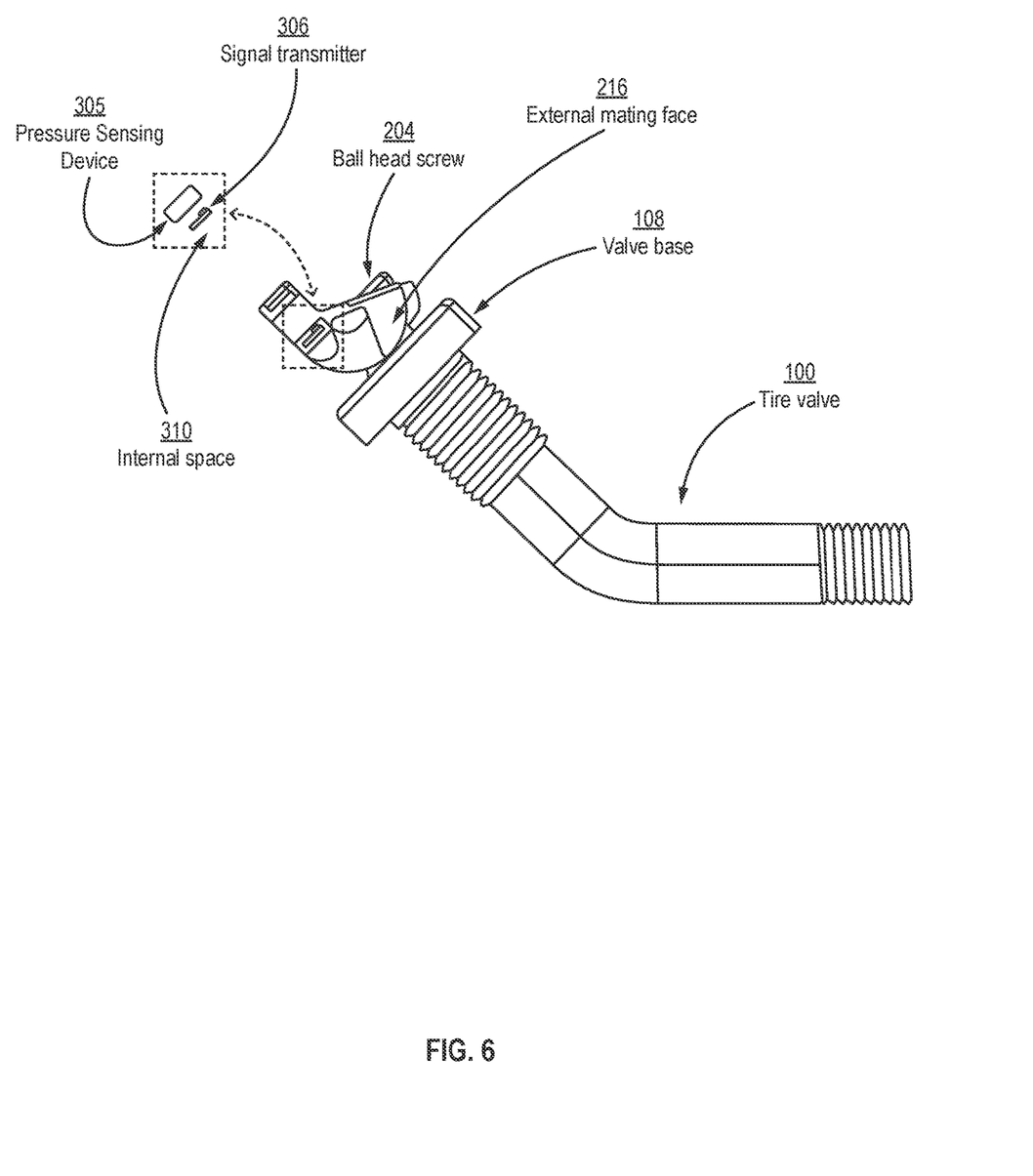
FIG. 6 is a side view of the embodiment shown in FIG. 4.
Figure 7:
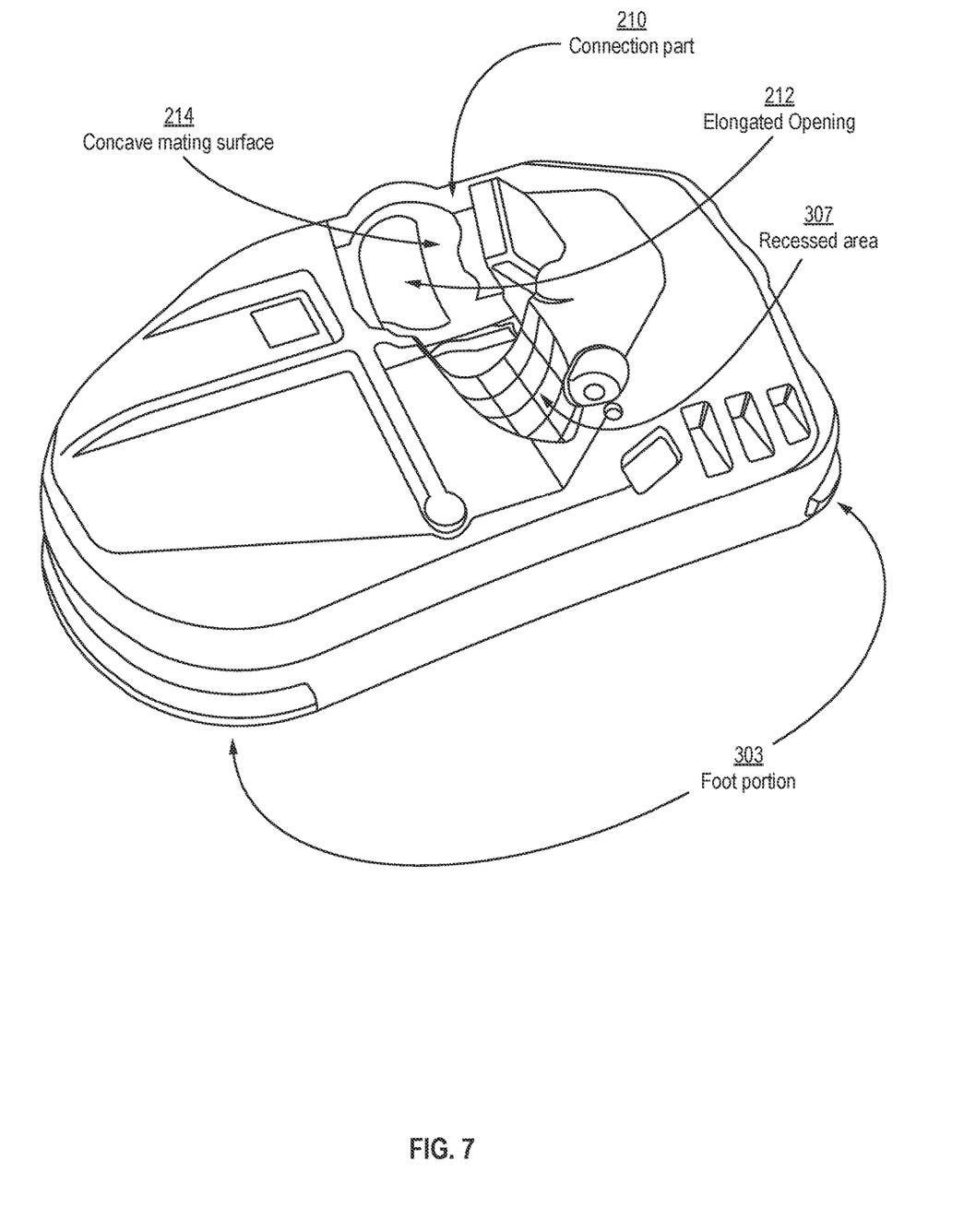
FIG. 7 is a top view of the sensor housing according to an embodiment of the disclosed tire monitoring system.

The two foot portions 303 can be equidistant from the connection part 210. The two foot portions 303 can be equidistant from the connection part 210 in a first direction perpendicular to a second edge 308, yet be non-equidistant from the connection part 210 in second direction that is perpendicular to the first direction. A pressure sensing device 305 (FIG. 6) may be entirely or partially located inside the internal space 310 and can be communicatively connected (not shown) to pressure of a volume immediately outside of the sensor housing 202, so as to allow the pressure immediately outside of the sensor housing 202 to be measured by the pressure sensing device 305. The communicative connection can be established by a passageway, or by a flexible member, or a flexible membrane between the internal space 310 and the volume immediately outside of the sensor housing 202. The pressure sensing device 305 measures pressure of air (a gas) of a volume immediately outside the housing 202. A signal transmitter 306 is coupled with the pressure sensing device 305 and relays an electromagnetic signal that is indicative of the measured pressure and is detectable by a receiver (not shown) that may be remote from the sensor housing 202 and can be located outside of the tire. The electromagnetic signal can be any known protocol such as FM, Bluetooth, Bluetooth Low Energy (BLE), WiFi, or Zigby.

As shown in FIG. 2A, the sensor housing 202 has a connection part 210 having an elongated opening 212 that connects with a recessed area 307 in the housing that extends longitudinally toward the elongated opening, wherein a ball head screw 204 extends through the elongated opening 212 and the recessed area 307 thereby connecting with the tire valve 100, so that the sensor housing 202 can be rotated with respect to the tire valve 100 when the ball head screw 204 is not tightened fully, and wherein the sensor housing 202 is secured in place and does not rotate with respect to the tire valve 100 when the ball head screw 204 is tightened fully. In some embodiments, the recessed area 307 extends longitudinally towards the first edge 304 to allow clearance to access the ball head screw 204 when the sensor housing 202 is mounted at shallow angles relative to the wheel rim.

The connection part 210 is incorporated into the sensor housing 202 and is located distal from the first edge 304, proximate to the second edge 308, of the sensor housing 202. The second edge 308 can be opposite to the first edge 304 that is proximate to the two foot portions 303. The connection part 210 is adapted to facilitate a range of angles at which the sensor housing 202 can be positioned with respect to the valve base 108. The sensor housing 202 rotates about an axis 317 (FIG. 4) with respect to a top surface 311 of the valve base 108.

The connection part 210 can be integrated with the sensor housing 202, comprise a concave portion 309, and be adjacent to and opening toward a recessed area 307 of the sensor housing 202 that is defined by the recessed area 307 in the top surface 301 of the sensor housing 202. The connection part 210 has two opposing edge walls 224 that extend from the top surface 301 of the sensor housing 202 to the bottom surface 302 of the sensor housing 202. Each edge wall 224 includes a notched portion 226 that provides a mechanical lock between the connection part 210 and the sensor housing 202 and prevents the connection part 210 from detaching from the sensor housing 202 when exposed to load vibrations and centrifugal forces experienced during operation.

Figure 3A:
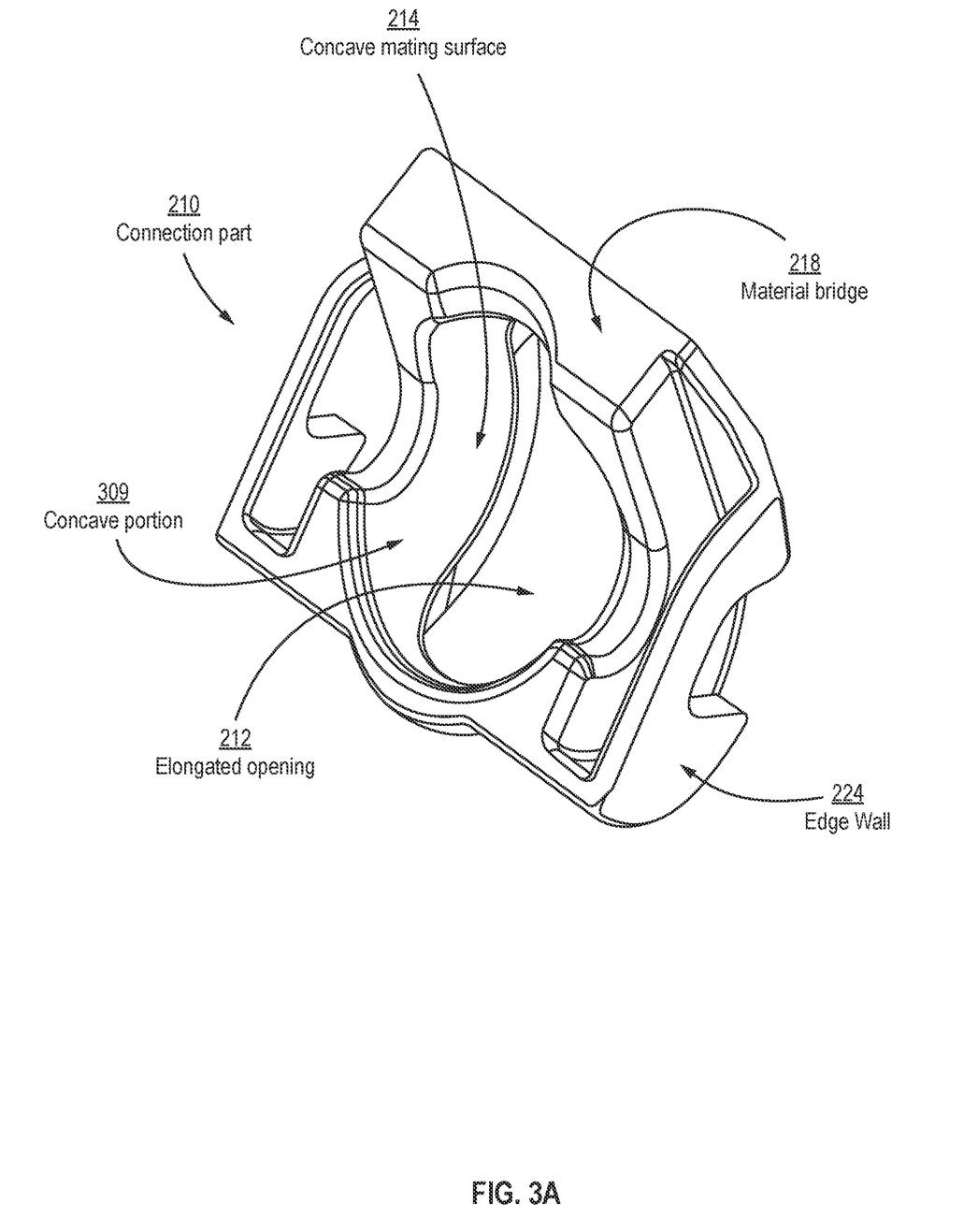
FIGS. 3A and 3B are views of the connection component of an embodiment of the disclosed tire monitoring system.
Figure 3B:
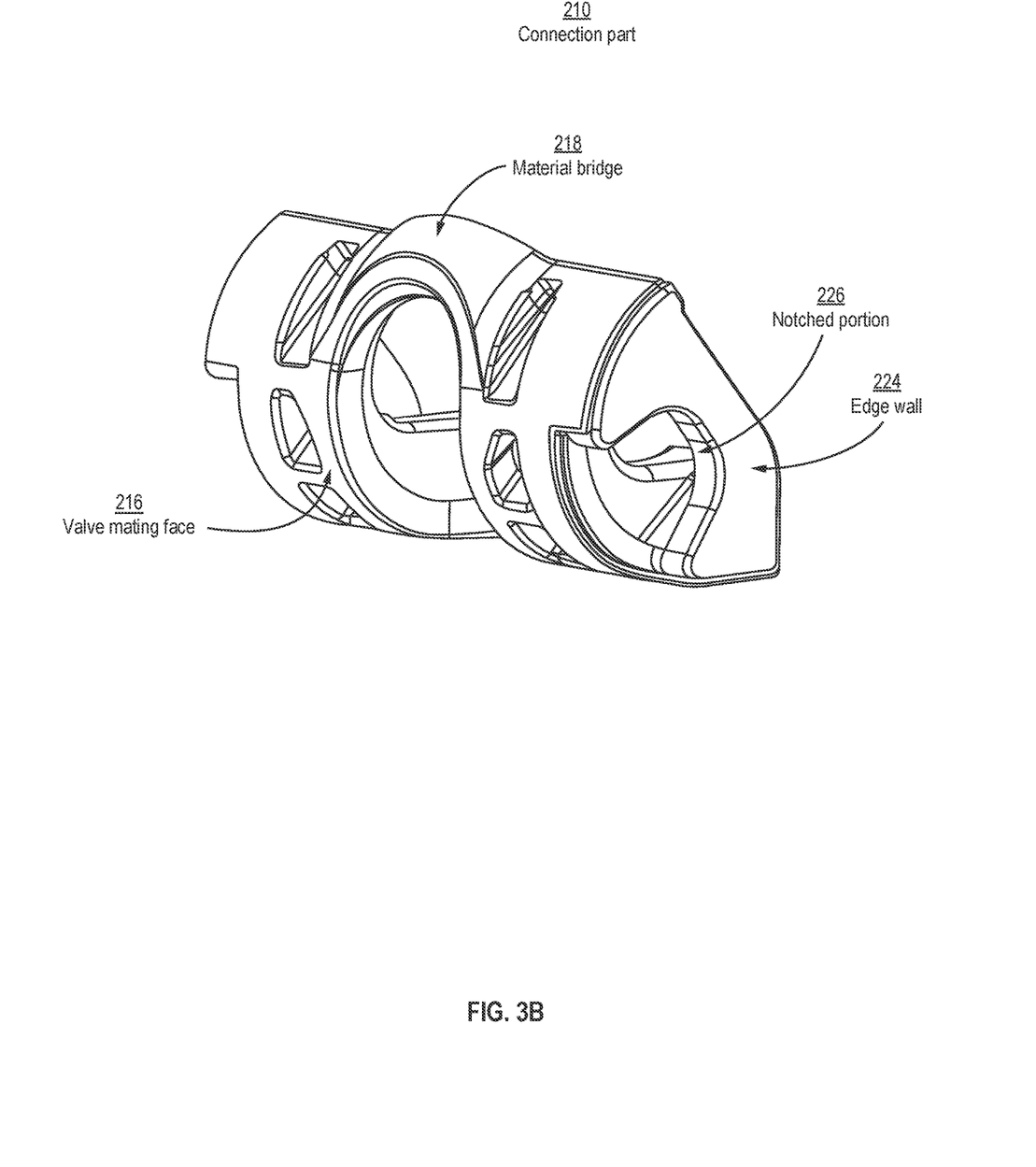

The connection part 210 can be formed of a same material as the sensor housing 202, or a different material, such as high strength stainless steel. The connection part 210 and the sensor housing can be a continuous material part, e.g., formed of a single plastic piece or metal piece, or be separate parts that are formed separately and integrated together either by mechanical connection, adhesive, or welding. In some embodiments, the connection part 210 can be manufactured by a metal injection molding (MIM) process. In other embodiments the connection part 210 can be manufactured by metal stamping. In other embodiments it can be made by additive manufacturing (3-D printing). The concave portion 309 faces the recessed area 307 when assembled. The concave portion 309 has an elongated opening 212 (FIG. 3) that is defined therein and extends at least partially in a direction that is perpendicular to the second edge 308. The elongated opening 212 can extend along the concave portion 309 and extend from the bottom surface 302 to the top surface 301. The elongated opening 212 can serve as a screw receptacle.

The connection part 210 has a concave valve mating surface 214, that can be of a concave shape facing the recessed area 307 of the sensor housing 202.

The ball head screw 204 couples the sensor housing 202 to the threaded portion 112 of the tire valve 100.

Figure 8A:
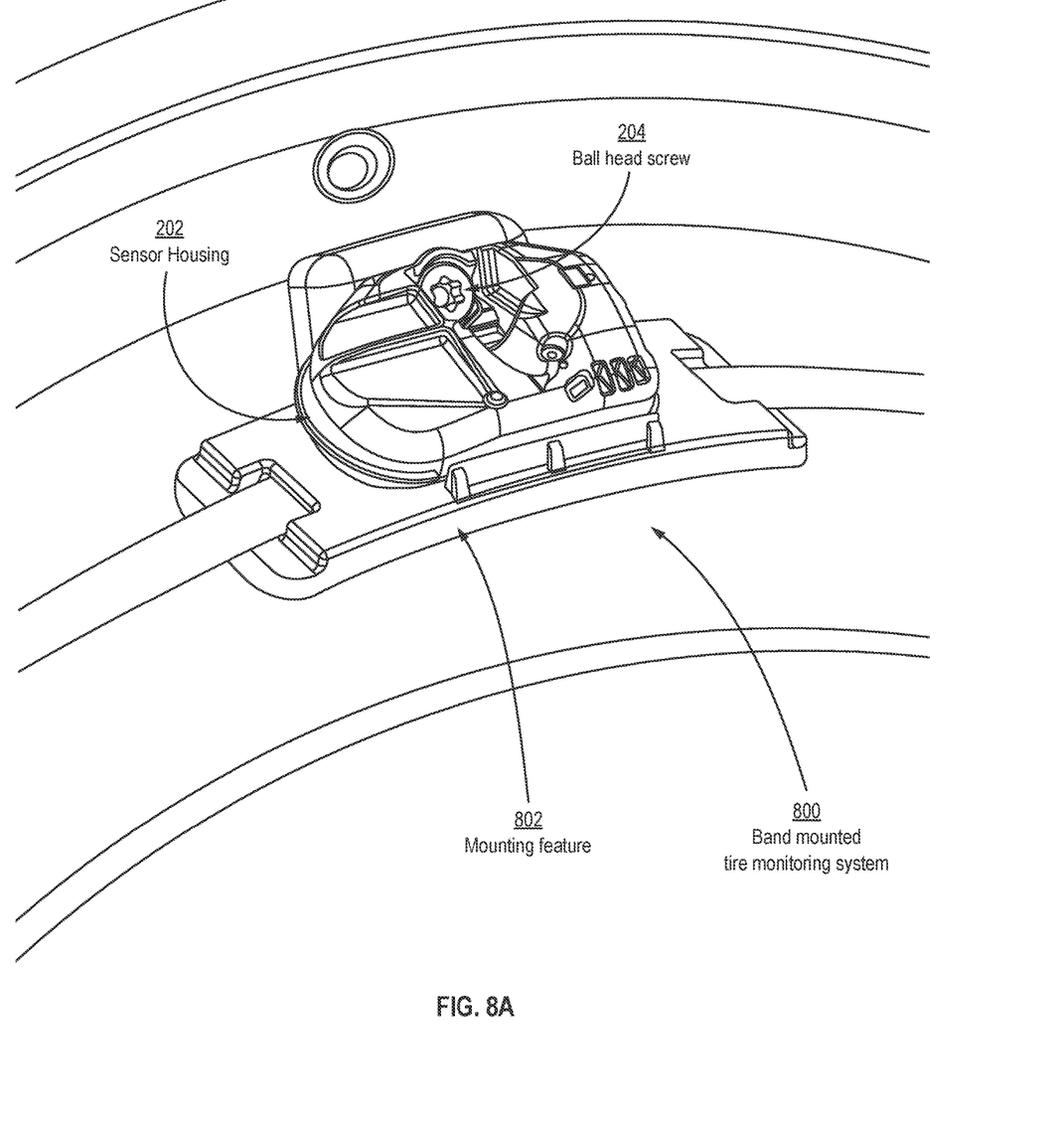
FIGS. 8A and 8B are views of a mounting feature according to an embodiment of the disclosed tire monitoring system.
Figure 8B:
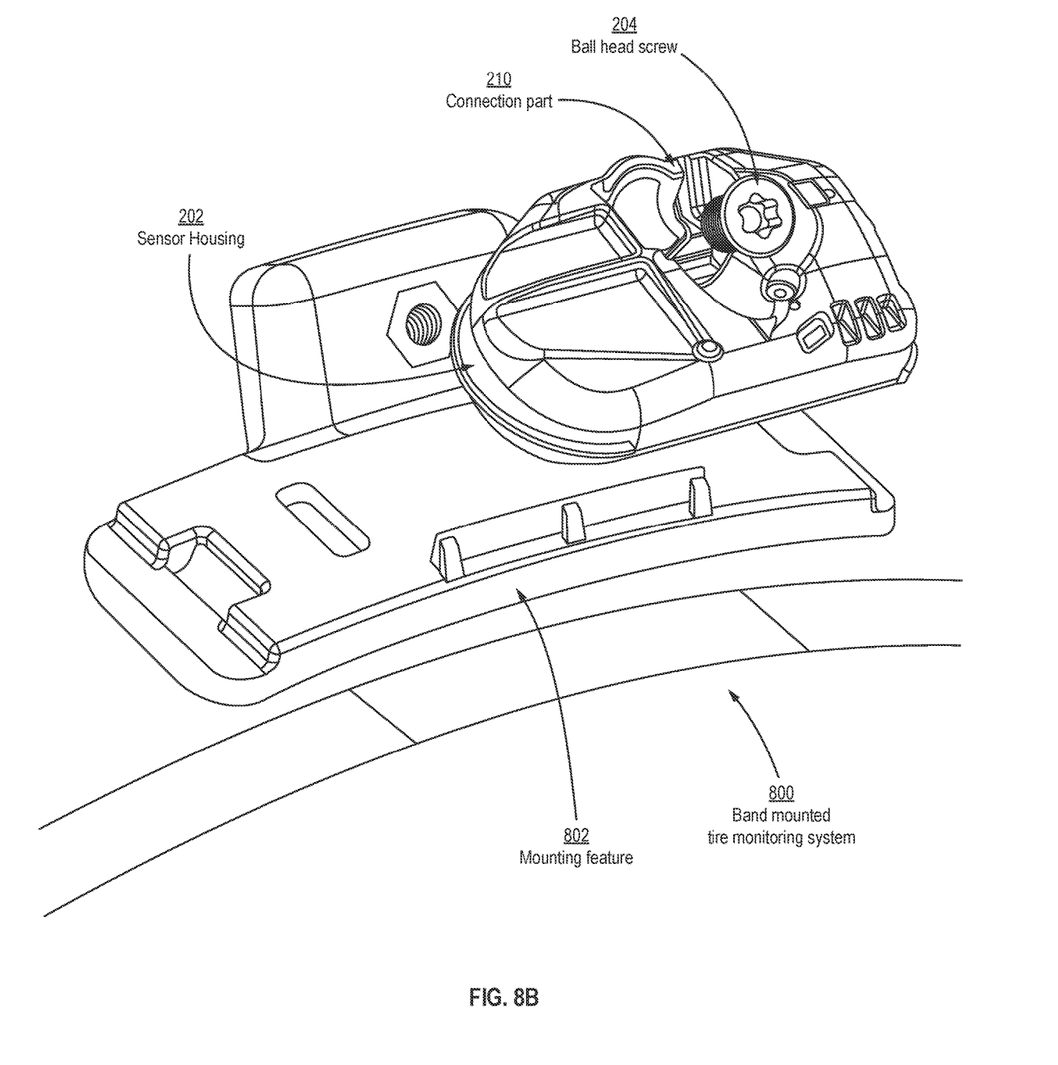

In some embodiments, the ball head screw 204 couples the sensor housing 202 to a corresponding mounting feature 802 in the wheel rim, e.g., a band mounted tire monitoring system 800 as shown in FIGS. 8A and 8B.

The connection part 210 of the tire monitoring system 200 includes the elongated opening 212 and a concave valve mating surface 214. The outer face of the connection part 210 includes an external valve mating surface 216 to allow the sensor housing to rotate on a valve base 108. The concave valve mating surface 214 can have a curved surface, a concave surface, an arched surface, a curved planar surface, a curved planar surface that has a constant radius, or a curved planar surface that has a non-constant radius, or a combination thereof. The valve mating surface 216 can have a curved surface, a convex surface, an arched surface, a curved planar surface, a curved planar surface that has a constant radius, or a curved planar surface that has a non-constant radius, or a combination thereof. The valve mating surface 216 can be adjacent to the second edge 308, and the valve mating surface 216 can be flush with the surface of the second edge 308 immediately adjacent to the valve mating surface 216. The valve mating surface 216 may contact the top surface 311 of the base portion 108 of the tire valve 100 and allow for angular adjustment and configuration of the connection part 210 and the sensor housing 202 with respect to the valve base 108.

The valve base 108 can be formed of a cylindrical, disk shaped, or tubular body, having an internal anulus 313 that extends therethrough and defines the inner annulus 313 that has a threaded portion 112. The valve base 108 has a top surface 311 on the head portion 312. The top surface 311 can be a flat surface and have the annulus 313 extend therethrough. The flat surface can be circular shaped.

The ball head screw 204 comprises an elongated tubular body 314 having an annulus 208 defined therethrough, and a threaded portion 315 on the outer surface of the elongated tubular body 314. The threaded portion 315 extends from a location proximate one end of the elongated tubular body 314 to a head 222 that has a curved mating face 206. The curved mating face 206 is convex in the direction facing the threaded portion 315. The threaded portion 315 is adapted to mate with the internal threaded portion 112 inside the valve base 108. The mating face 206 is adapted to mate with the concave shaped valve mating surface 214 of the valve connection part 210. The threaded portion 315 of the ball head screw 204 mates with the threaded portion 112 of the valve base 108, and the valve mating surface 216 of the connection part 210 is held against the top surface 311 of the valve base 108 and may prevent rotation of the sensor housing 202 with respect to the valve base 108. In some embodiments, the ball head screw 204 may be a two-part screw with a detachable connection or a screw with a curved washer.

Figure 4:
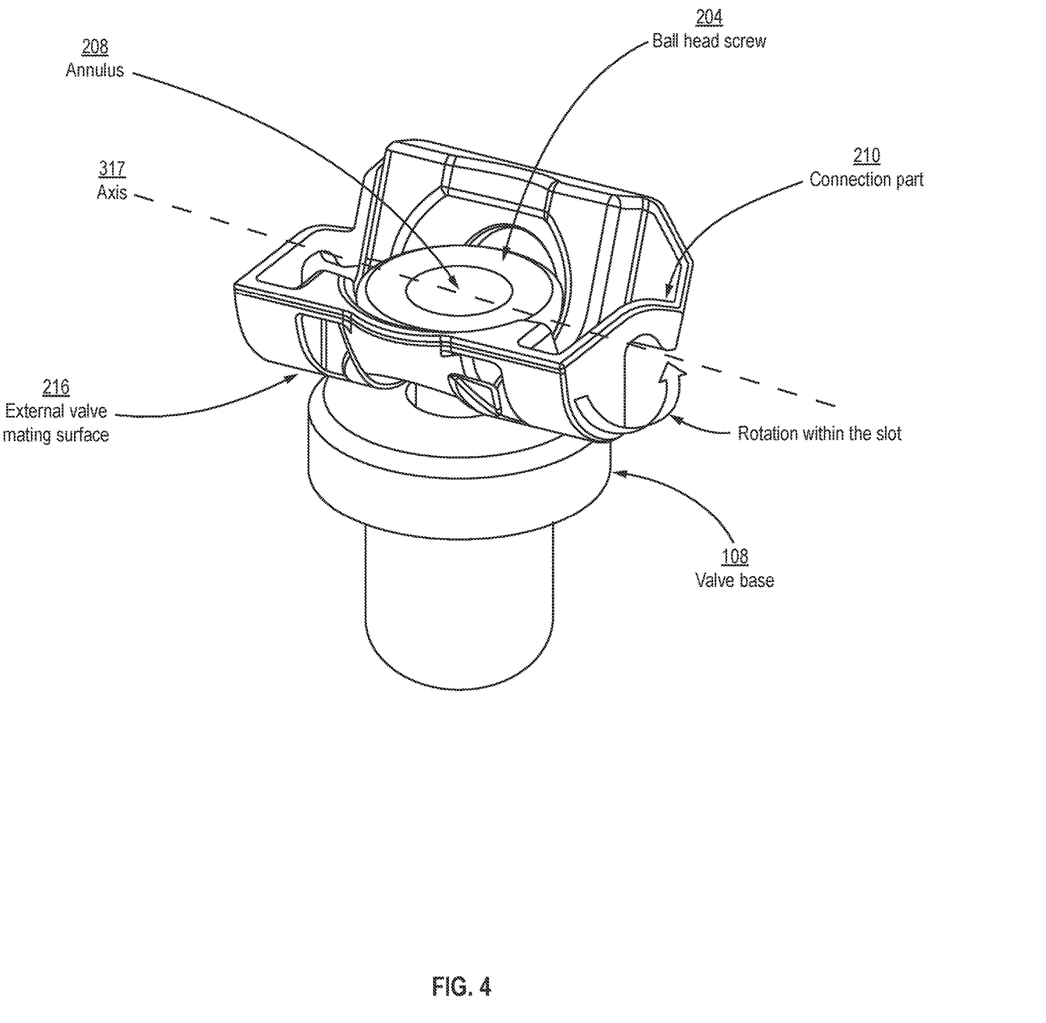
FIG. 4 is a view of the ball and socket assembly on an embodiment of the disclosed valve stem.
Figure 5:
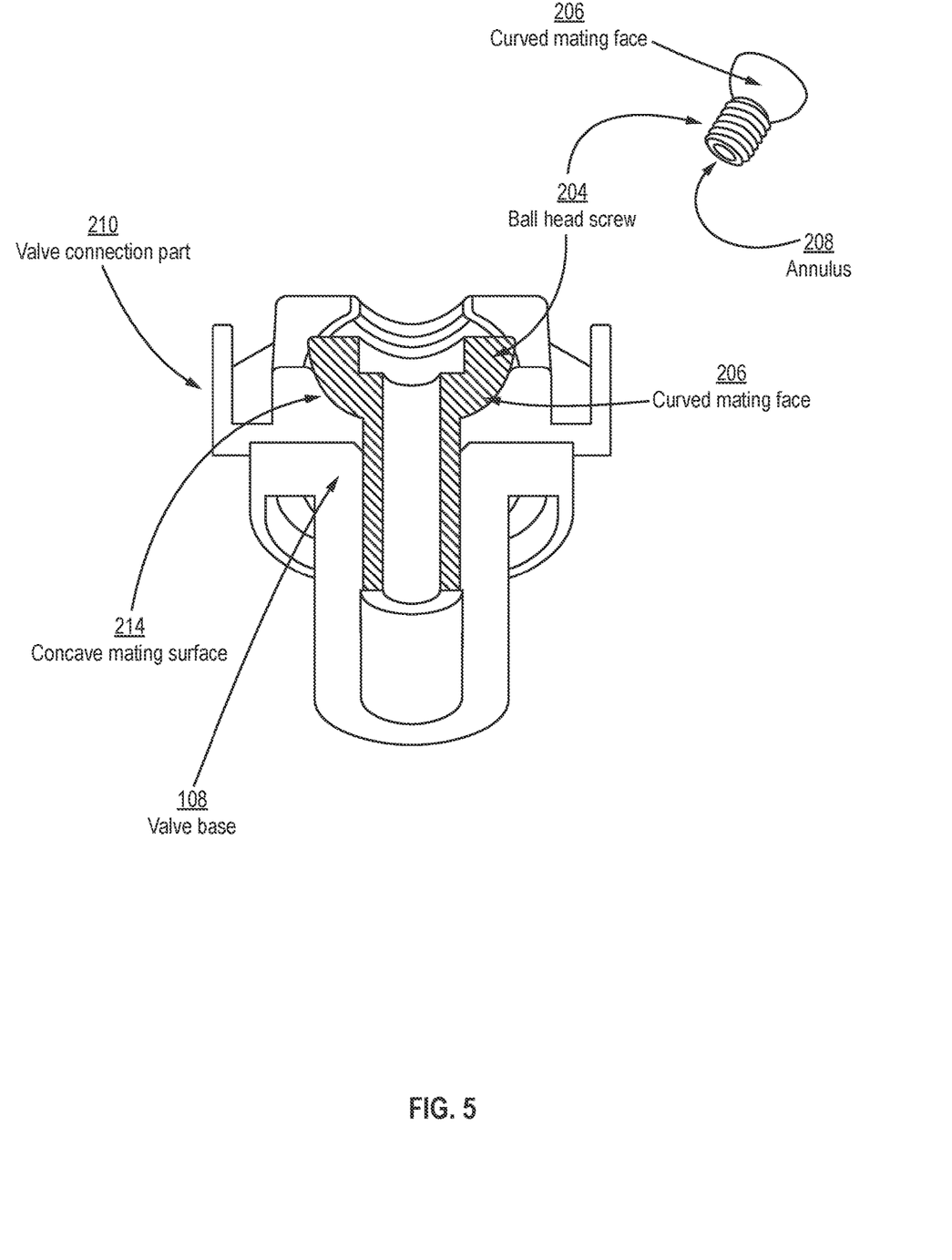
FIG. 5 is a cross-sectional view of the embodiment shown in FIG. 4.

As further shown in FIGS. 4 and 5, the ball head screw 204 has an annulus 208 to allow airflow from the tire valve 100 for tire inflation or deflation. The ball head screw 204 further includes a curved mating face 206 complimentarily matched to the concave portion 309 of the connection part 210 that defines a curved socket in the concave shaped valve mating surface 214 as shown in FIG. 5. The ball head screw 204 is inserted through the elongated opening 212 and the curved mating face 206 is rotatably seated inside and against the curved socket defined by the concave shaped valve mating surface 214, allowing the ball head screw 204 to lock the sensor housing 202 at an angle relative to the wheel rim when the ball head screw 204 is installed and tightened into the threaded portion 112 of the tire valve 100. The angle can be selected from a range of angles and secured by rotating and tightening the ball head screw 204.

When tightened properly, the installation torque of the ball head screw 204 is sufficient enough to prevent the sensor housing 202 from lifting under the centrifugal loads experienced during operation. During installation, the curved mating face 206 may cause a lateral force acting to open the elongated opening 212. A reinforced material bridge 218 may be included on the top portion of the curved socket in the concave shaped valve mating surface 214 to strengthen the valve connection part 210 and to provide resistance to the lateral forces applied during installation to protect the sensor housing 202 from damage. The reinforced material bridge 218 can also provide a limit to the rotation of the ball head screw 204.

Each tire pressure monitoring system may be provided in kit form where the components are provided along with instructions for attaching the tire monitoring system to a tire valve assembly. The instructions can be included with the kit, provided on the internet, or be provided by any other means. The tire valve assembly may not be provided in the kit as the tire valve assembly may be, for example, already installed in the tire, i.e., when the tire monitoring system is replacing a failed unit or when the tire valve assembly is provided separately from the tire monitoring system, as would be understood by one of ordinary skill in the art.

Thus, one exemplary kit providing the tire monitoring system 200, and which would be applicable to the descriptions provided herein, would contain the sensor housing 202 with the coupled valve connection part 210, the ball head screw 204, and a set of installation instructions (not shown).

It is to be understood that the details of construction and the arrangement of the components set forth in the description or illustrated in the drawings are not limiting. There are other ways of being practiced or carried out. Also, it is to be understood that the phraseology and terminology employed herein are for the purpose of description only and should not be regarded as limiting.

While various aspects have been described, it will be apparent to those of ordinary skill in the art that many more embodiments and implementations are possible and are within the scope of this invention.

What is claimed is:

1. A tire monitoring apparatus comprising:
   a sensor housing having a pressure sensor therein; and
   a connection part integrated with the sensor housing, the connection part comprising an external mating surface that is convex in shape, an internal concave surface facing toward a recessed portion of the sensor housing surface;
   the connection part defining therein a slot that extends through the connection part from the concave surface through to the convex surface, and is elongated so that a screw with a head portion and a threaded body portion can extend through the slot so that the head of the screw is larger than the narrowest width of the slot and is held on the concave side of the connection part while the threaded body portion extends through the slot and protrudes beyond the convex surface of the connection part,
   the slot is adapted to allow for travel of the screw along a lengthwise direction of the slot while the screw remains substantially perpendicular to the concave surface and while the head of the screw remains in contact with the concave surface, thereby allowing for rotation of the sensor housing with respect to the screw while maintaining contact between the screw head and the concave surface,
   wherein the screw is configured to couple to a tire valve to maintain the sensor housing at an angle with respect to a tire valve, by way of tightening the screw into a threaded connection with the tire valve.

2. The tire monitoring apparatus of claim 1, wherein the connection part further comprises opposing edge walls, each edge wall includes a notched portion configured to provide a mechanical lock between the connection part and the sensor housing.

3. The tire monitoring apparatus of claim 1, wherein the screw is a ball head screw, and a first opening of the elongated slot forms a curved socket for coupling to a head of the ball head screw and preventing further insertion of the ball head screw into the elongated slot.

4. The tire monitoring apparatus of claim 2, further comprising;
   the ball head screw configured for insertion into the opening of the slot to couple the connection part to the tire valve, and to maintain the sensor housing at an angle, with respect to a tire valve, within a predetermined range of angles.

5. The tire monitoring apparatus of claim 1 wherein the screw has at least two parts connected to each other via a detachable connection.

6. The tire monitoring apparatus of claim 1 wherein the screw includes a curved washer adapted to mate with the concave surface of the connection part.

* * * * *